(12) United States Patent
Bijwaard et al.

(10) Patent No.: US 8,767,733 B2
(45) Date of Patent: *Jul. 1, 2014

(54) METHOD AND APPARATUS FOR ESTABLISHING MULTICAST GROUPS

(75) Inventors: Dennis Bijwaard, Enschede (NL); Arjan deHeer, Hengelo (NL); Dirk-Jaap Plas, Enschede (NL)

(73) Assignee: Alcatel Lucent, Paris (FR)

( * ) Notice: Subject to any disclaimer, the term of this patent is extended or adjusted under 35 U.S.C. 154(b) by 71 days.

This patent is subject to a terminal disclaimer.

(21) Appl. No.: 13/534,291

(22) Filed: Jun. 27, 2012

(65) Prior Publication Data

US 2012/0275457 A1 Nov. 1, 2012

Related U.S. Application Data

(63) Continuation of application No. 11/551,516, filed on Oct. 20, 2006, now Pat. No. 8,249,068.

(51) Int. Cl.
*H04L 12/28* (2006.01)

(52) U.S. Cl.
USPC .......................................... 370/390; 709/227

(58) Field of Classification Search
USPC .......................................... 370/390; 709/227
See application file for complete search history.

(56) References Cited

U.S. PATENT DOCUMENTS

| | | | |
|---|---|---|---|
| 5,956,491 A | 9/1999 | Marks | |
| 6,587,943 B1 | 7/2003 | Hardjono | |
| 7,894,377 B2* | 2/2011 | Lillie et al. | 370/312 |
| 8,249,068 B2* | 8/2012 | Bijwaard et al. | 370/390 |
| 2003/0108000 A1 | 6/2003 | Chaney et al. | |
| 2004/0132448 A1 | 7/2004 | Torres et al. | |
| 2004/0193635 A1 | 9/2004 | Hsu et al. | |
| 2005/0060411 A1 | 3/2005 | Coulombe et al. | |
| 2005/0233776 A1 | 10/2005 | Allen et al. | |
| 2006/0034202 A1 | 2/2006 | Kuure et al. | |
| 2006/0221937 A1 | 10/2006 | Olivier et al. | |
| 2006/0268873 A1 | 11/2006 | Tonjes et al. | |
| 2007/0054687 A1 | 3/2007 | Akita et al. | |

FOREIGN PATENT DOCUMENTS

WO WO 01/67787 A2 9/2001

OTHER PUBLICATIONS

Apr. 17, 2008 International Search Report & Written Opinion in PCT/US2007/022032, Lucent Technologies Inc., Applicant, 13 pages.
Apr. 26, 2011 Office Action in Chinese Patent Application No. 200780038777.5, Lucent Technologies Inc., Applicant, 6 pages.

(Continued)

*Primary Examiner* — Wei Zhao
(74) *Attorney, Agent, or Firm* — Wall & Tong, LLP (57) ABSTRACT

The invention includes a method and apparatus for dynamically establishing a multicast group. The method includes receiving, from a first user device, a request to establish a multicast group including a plurality of parameters adapted for establishing the multicast group, obtaining a multicast address for the multicast group, and establishing the multicast group using the assigned multicast address and the parameters. The parameters include at least one multicast group definition parameter and at least one multicast session description parameter. The multicast address and at least a portion of the parameters are adapted for being provided to a second user device to enable the second user device to dynamically join the multicast group.

20 Claims, 5 Drawing Sheets

(56) References Cited

OTHER PUBLICATIONS

Henning Schulzrinne et al: "The Session Initiation Protocol: Internet-Centric Signaling," IEEE Communications Magazine, IEEE Service Center, Piscataway, US, vol. 38. No. 10, Oct. 2000 92000-10), pp. 134-141, XP011091370.

M. Handley et al., RFC2974, "Session Announcement Protocol," Network Working Group, Oct. 2000.
Wittmann R and Zitterbart M: "Multicast Communication: Protocols and Applications," Morgan Kaufmann Publishers, San Francisco, May 12, 2000, XP002475516, p. 40-p. 44; p. 286-p. 302.

\* cited by examiner

METHOD AND APPARATUS FOR ESTABLISHING MULTICAST GROUPS

CROSS-REFERENCE TO RELATED APPLICATION

This application is a continuation of U.S. patent application Ser. No. 11/551,516, filed on Oct. 20, 2006, now U.S. Pat. No. 8,249,068 entitled METHOD AND APPARATUS FOR ESTABLISHING MULTICAST GROUPS, which application is hereby incorporated herein by reference as if set forth in its entirety.

FIELD OF THE INVENTION

The invention relates to the field of communication networks and, more specifically, to establishing multicast groups.

BACKGROUND OF THE INVENTION

Internet Protocol (IP) multicast is a bandwidth-conserving technology that delivers IP traffic conveying a single stream of information from a transmitter to multiple receivers which form a multicast group. IP multicast may be used for numerous applications such as videoconferencing, distance learning, software distribution, and the like. IP multicast packets are replicated in the network by multicast routers supporting various multicast protocols for managing multicast group membership, replicating IP multicast packets, and performing like functions associated with IP multicast. Dynamic establishment of multicast groups is currently performed using the Session Announcement Protocol (SAP), including the associated Session Directory Tool (SDR), as defined in RFC2974, which uses a distributed session directory and session announcements to dynamically establish a multicast group.

SUMMARY OF THE INVENTION

Various deficiencies in the prior art are addressed through the invention of a method and apparatus for dynamically establishing a multicast group. The method includes receiving, from a first user device, a request to establish a multicast group including a plurality of parameters adapted for establishing the multicast group, obtaining a multicast address for the multicast group, and establishing the multicast group using the assigned multicast address and the parameters. The parameters include at least one multicast group definition parameter and at least one multicast session description parameter. The multicast address and at least a portion of the parameters are adapted for being provided to a second user device to enable the second user device to dynamically join the multicast group.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables dynamic establishment of multicast groups. The present invention enables dynamic establishment of multicast groups by user devices. The present invention enables signaling other than multicast protocol signaling (e.g., Session Initiation Protocol (SIP) signaling, Hypertext Transfer Protocol (HTTP) signaling, and the like, as well as various combinations thereof) to be used for establishing IP multicast groups. As such, the present invention supports robust, dynamic establishment of multicast groups.

Figure 1:
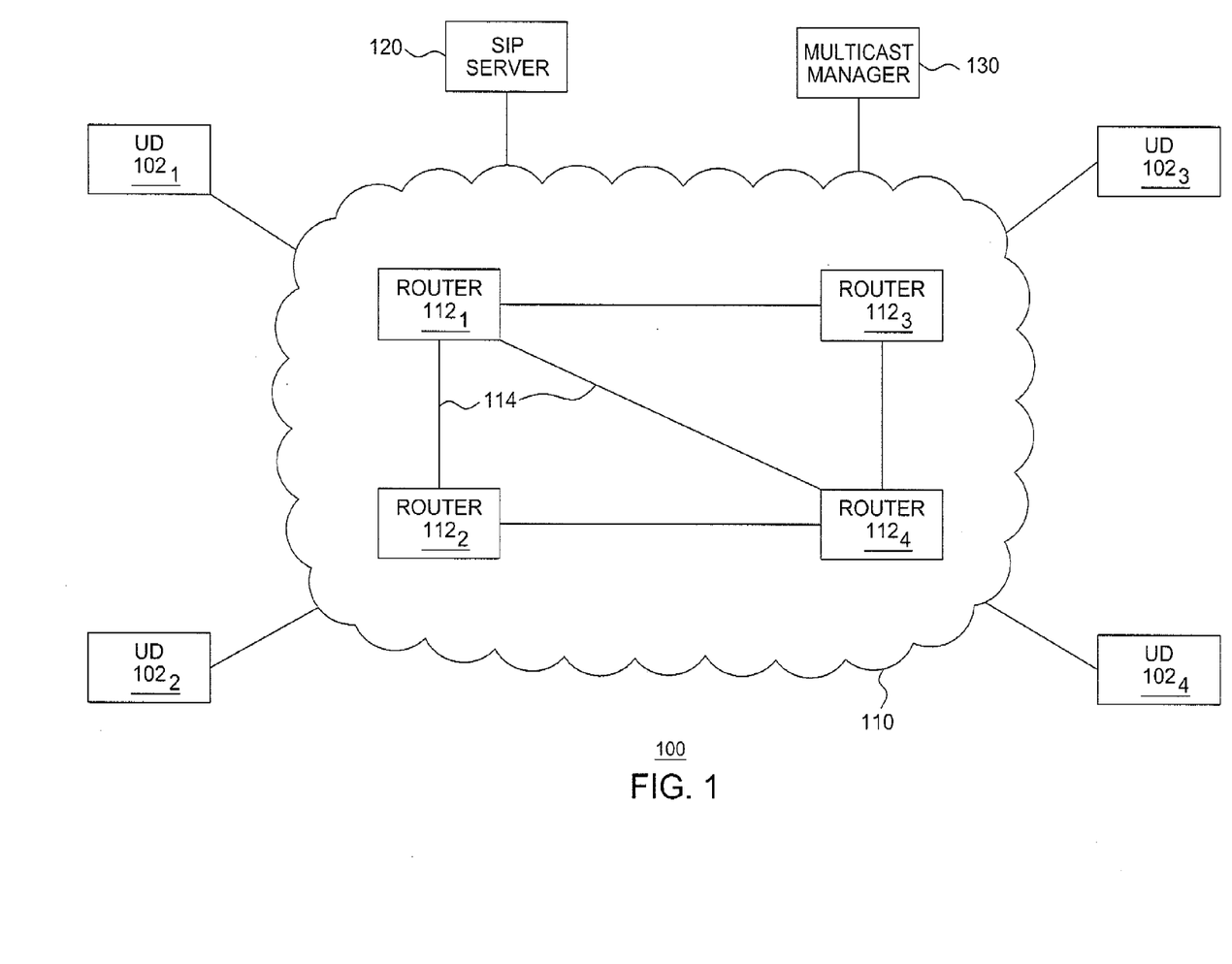
FIG. 1 depicts a high-level block diagram of a communication network.

FIG. 1 depicts a high-level block diagram of a communication network. Specifically, communication network 100 of FIG. 1 includes a plurality of user devices (UDs) $102_1$-$102_4$ (collectively, UDs 102), a transport network (TN) 110, a SIP server (SS) 120, and a Multicast Manager (MM) 130. The UDs $102_1$-$102_4$ communicate with TN 110 using respective communication paths which may include network elements and communication links for transporting signaling and bearer traffic between UDs 102 and TN 110. The SS 120 and MM 130 communicate with TN 110 using communication paths which may include network elements and communication links for transporting signaling traffic between SS 120 and MM 130, respectively, and TN 110.

The UDs 102 include devices operable for participating in multicast sessions. For example, UDs 102 may include wireline phones, wireless phones, computers, and the like, as well as various combinations thereof. The UDs 102 support multicast functions enabling participation in multicast sessions. The UDs may initiate establishment of multicast groups. The UDs 102 may invite other UDs 102 to join a multicast group and UDs 102 may request permission from other UDs 102 to join a multicast group. After joining a multicast group, UDs 102 may operate as sending UDs and/or receiving UDs. The UDs 102 may support various applications requiring multicast capabilities, such as video conferencing applications, instant messaging applications, and the like, as well as various combinations thereof.

The TN 110 includes a plurality of routers $112_1$-$112_4$ (collectively, routers 112). The routers 112 may include multicast routers (i.e., routers including multicast functionality, including support for one or more multicast protocols (e.g., Protocol Independent Multicast (PIM), Internet Group Management Protocol (IGMP), and like multicast protocols, as well as various combinations thereof). The multicast functionality may include IP multicast functionality. The routers 112 communicate using a plurality of communication paths (CPs) 114 which may include network elements and communication links adapted for transporting traffic between various combinations of routers 112.

The SS 120 is a server supporting SIP signaling. The SS 120 may route SIP messages between UDs 102. For example, SS 120 may route SIP INVITE messages between UDs 102 and between UDs 102 and routers 112, thereby enabling UDs 102 to invite other UDs 102 to join a multicast group and enabling UDs 102 to request to join a multicast group. The SS 120 may route messages between UDs 102 and MM 130. The MM 130 is a system adapted for managing multicast functions. The MM 130 may perform at least a portion of the functions described herein, including establishing a multicast group according to a request to establish a multicast group received from one of UDs 102.

Although primarily depicted and described with respect to specific numbers and configurations of UDs 102, routers 112, SSs 120, and MMs 130, the present invention may be implemented using various other numbers and configurations of UDs 102, routers 112, SSs 120, and MMs 130, and, in some embodiments, other network elements adapted to perform various functions depicted and described herein. The operation of UDs 102, routers 112, SS 120, and MM 130 in support of multicast establishment and communication functions of the present invention may be better understood with respect to FIG. 2-FIG. 5.

Figure 2:
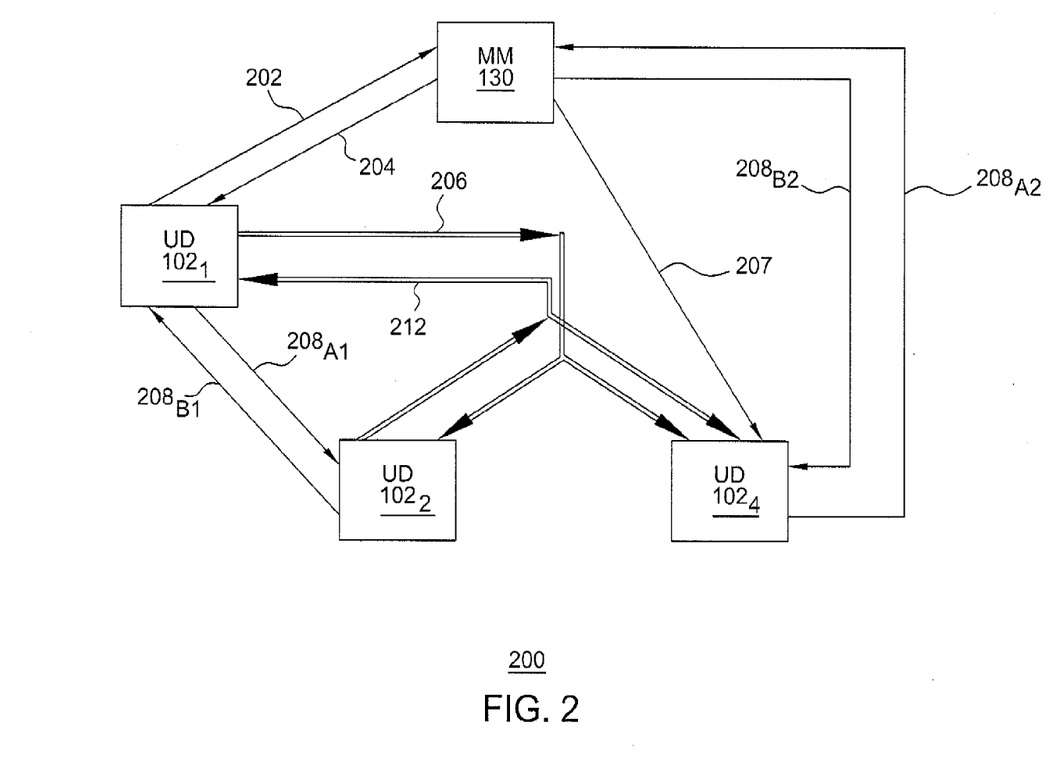
FIG. 2 depicts a high-level block diagram of a portion of the communication network of FIG. 1 including signaling according to one embodiment of the present invention.

FIG. 2 depicts a high-level block diagram of a portion of the communication network of FIG. 1 including signaling according to one embodiment of the present invention. The communication network portion 200 of FIG. 2 includes UDs $102_1$, $102_2$, and $102_4$. The communication network portion 200 of FIG. 2 further includes MM 130. For purposes of clarity in describing functions of the present invention, routers 112 and SS 120 are omitted (although, as depicted and described herein with respect to FIG. 3 and FIG. 4, routers 112 and SS 120 may support various functions of the present invention). The signaling depicted and described herein with respect to FIG. 2 is performed in order to establish a multicast group including UDs $102_1$, $102_2$, and $102_4$, and in order to support the associated multicast stream of the established multicast group.

At step 202, UD $102_1$ creates a request to establish a multicast group and forwards the request to establish the multicast group to MM 130. The UD $102_1$ forwards the request to establish the multicast group to MM 130. The UD $102_1$ may forward the request to establish the multicast group to MM 130 using one or more of a plurality of protocols and associated message formats. In one embodiment, UD $102_1$ forwards the request to establish the multicast group to MM 130, and other message and information may be exchanged, using SIP signaling. Use of SIP signaling for the present invention is depicted and described herein in more detail with respect to FIG. 3, FIG. 4, and FIG. 5.

The request to establish the multicast group includes one or more parameters. The one or more parameters included in the request to establish the multicast group include one or more parameters adapted to establish the multicast group. The one or more parameters included in the request to establish the multicast group include one or more parameters adapted to define the multicast group being established (denoted as multicast group definition parameters). The one or more parameters included in the request to establish the multicast group include one or more parameters adapted to describe the multicast session for the multicast group being established (denoted as multicast session description parameters). The one or more parameters included in the request to establish the multicast group may include various other parameters.

The multicast group definition parameters may include a time at which the multicast group is scheduled to be established, a list of network elements authorized to initiate an invitation to join the multicast group, a list of user devices authorized to join the multicast group, and the like, as well as various combinations thereof. In one embodiment, in which the multicast group definition parameters include a list of user devices authorized to join the multicast group, the multicast group definition parameters may further include one or more privileges associated with the user devices authorized to join the multicast group.

The time at which the multicast group is scheduled to be established may specify that the multicast group be established immediately or at a future date/time. The list of network elements authorized to initiate an invitation to join the multicast group may include one or more user devices (e.g., only UD $102_1$ is authorized to invite other UDs 102 to join the multicast group), one or more management systems (e.g., MM 130), and the like, as well as various combinations thereof. The list of user devices authorized to join the multicast group may include any user devices (and, in some embodiments, may alternatively be provided as a list of users authorized to join the multicast group).

In one embodiment, the list of user devices authorized to join the multicast group may include, for each user device in the list, at least one parameter (attribute) adapted for indicating whether the user device should be automatically invited to join the multicast group in response to establishment of the multicast group. The parameter may be denoted as an invite parameter. In one embodiment, the invite parameter associated with a user device may indicate that the management system which established the multicast group (illustratively, MM 130) should automatically invite the user device to join the multicast group in response to establishment of the multicast group.

In one embodiment, the list of user devices authorized to join the multicast group may include, for each user device in the list, at least one privilege parameter (attribute) defining participation by the user device in the multicast session. In one embodiment, a privilege parameter associated with each user device authorized to join a multicast group may include an indication as to whether the user device may transmit multicast traffic to other members of the multicast group (i.e., operate only as a receiving UD or as both a receiving and sending UD). Although described with respect to one specific privilege parameter, various other privilege parameters associated with individual UDs or groups of UDs may be specified in the request to establish the multicast group.

In one embodiment, the request to establish the multicast group may specify that specific devices are authorized to invite specific sets of user devices (i.e., user devices authorized to join the multicast group) to join the multicast group. For example, the request to establish the multicast group may specify that UD $102_1$ is authorized to invite UD $102_2$ (and other user devices (not depicted)) to join the multicast group and MM 130 is authorized to invite UD $102_4$ (and other user devices (not depicted)) to join the multicast group.

The multicast session description parameters may include any parameter adapted for defining the multicast session by which multicast traffic is multicasted to members of the multicast group. In one embodiment, for example, multicast session description parameters include at least one of an IP address (i.e., multicast address to be used by members of the multicast group), one or more ports (i.e., multicast ports to be used by members of the multicast group), one or more coder-decoders (codecs) (i.e., codecs to be used by members of the multicast group), and the like, as well as various combinations thereof. Although described with respect to specific multicast session description parameters, various other multicast session description parameters may be specified in the request to establish the multicast group.

In response to the request to establish the multicast group, MM 130 obtains a multicast address for the multicast group.

The MM 130 may obtain the multicast address locally (e.g., from a list or range of available multicast addresses). The MM 130 assigns the multicast address to the multicast group. The MM 130 stores a mapping between the multicast group and the assigned multicast address. In one embodiment, MM 130 stores at least a portion of the parameters included in the request to establish the multicast group. The MM 130 stores the parameters included in the request to establish the multicast group in a manner for associating the stored parameters with the multicast group. In one embodiment, MM 130 stores at least a portion of the multicast group definition parameters included the request to establish the multicast group. In one embodiment, MM 130 stores at least a portion of the multicast session description parameters included in the request to establish the multicast group.

At step 204, MM 130 sends a multicast group response message to UD $102_1$. The multicast group response message includes the multicast address assigned to the multicast group. The multicast group response message may include at least a portion of the parameters included in the request to establish the multicast group (e.g., for verification of the parameters used by MM 130 to establish the multicast group). In one such embodiment, the multicast group response message may include the multicast session description parameters accepted during establishment of the multicast group. The multicast group response message may include a multicast group identifier. At step 206, UD $102_1$ begins transmitting multicast traffic to the multicast group using the assigned multicast address. The UD $102_1$ begins transmitting multicast traffic using a multicast session in accordance with the multicast session description parameters.

At step 207, MM 130 initiates an invite to UD $102_4$ to join the multicast group established by MM 130. In one embodiment, the invite to UD $102_4$ to join the established multicast group may be initiated by MM 130 automatically in response to establishment of the multicast group. As described herein, in one embodiment, the request to establish the multicast group may include one or more parameters (denoted as an invite parameter(s)) adapted for identifying user device(s) 104 that should be automatically invited to join the multicast group in response to establishment of the multicast group.

At step 208, other user devices begin joining the multicast group dynamically requested by UD $102_1$ and dynamically established by MM 130. There are several ways in which user devices may join the multicast group. A user device may be invited to join the multicast group (e.g., by a user device that dynamically requested establishment of the multicast group (illustratively, UD $102_1$), by a management system associated with establishment of the multicast group (illustratively, MM 130), and the like, as well as various combinations thereof). A user device may request to join the multicast group (e.g., sending a request to a user device which dynamically requested establishment of the multicast group (illustratively, UD $102_1$), sending a request to a management system associated with establishment of the multicast group (illustratively, MM 130), and the like, as well as various combinations thereof).

At step $208_{A1}$, UD $102_1$ sends an invitation to UD $102_2$ inviting UD $102_2$ to join the multicast group. In one embodiment, the invitation from UD $102_1$ to UD $102_2$ inviting UD $102_2$ to join the multicast group may include the multicast address of the multicast group, as well as one or more multicast session description parameters required by UD $102_2$ in order to participate in the multicast group. At step $208_{B1}$, in response to the invitation to join the multicast group, UD $102_2$ accepts the invitation from UD $102_1$ to join the multicast group. The UD $102_2$ may then begin receiving multicast traffic over the multicast address of the multicast group. Although omitted for purposes of clarity, in one embodiment, UD $102_2$ (or other UDs 102) may initiate a request to UD $102_1$ to be joined to the multicast group.

At step $208_{A2}$, UD $102_4$ initiates a request to MM 130 requesting to join the multicast group. At step $208_{B2}$, in response to the request to join the multicast group, MM 130 accepts the request from UD $102_4$ to join the multicast group. In one embodiment, the acceptance by MM 130 of the request by UD $102_4$ to join the multicast group may include the multicast address of the multicast group, as well as one or more multicast session description parameters required by UD $102_4$ in order to participate in the multicast group. The UD $102_4$ may then begin receiving multicast traffic over the multicast address of the multicast group. Although omitted for purposes of clarity, in one embodiment, MM 130 may initiate a request to UD $102_4$ (or other UDs 102) inviting UD $102_4$ to join the multicast group.

Although described with respect to specific methods by which user devices join a multicast group, user devices may join a multicast group using various other methods. In one example, although omitted for purposes of clarity, a user device may join a multicast group through a router using standard multicast join capabilities. In another example, a user device may be joined to a multicast group by a management system (illustratively, MM 130) through communication between the manager and the router. These and other methods by which user devices may join an established multicast group may be better understood with respect to FIG. 3 and FIG. 4 depicted and described herein.

Upon joining the multicast group, at step 210, UD $102_2$ begins receiving multicast traffic from UD $102_1$ over the multicast address of the multicast group. Upon joining the multicast group, at step 212, UD $102_2$ begins transmitting multicast traffic to UD $102_1$ and $102_4$ over the multicast group. Upon joining the multicast group, at step 210, UD $102_4$ begins receiving multicast traffic from UD $102_1$ over the multicast address of the multicast group. Upon joining the multicast group, at step 212, UD $102_4$ begins receiving multicast traffic from UD $102_2$ over the multicast address of the multicast group. Although omitted for purposes of clarity, UDs $102_2$ and $102_4$ may leave the multicast group using any means of leaving the multicast group.

Figure 3:
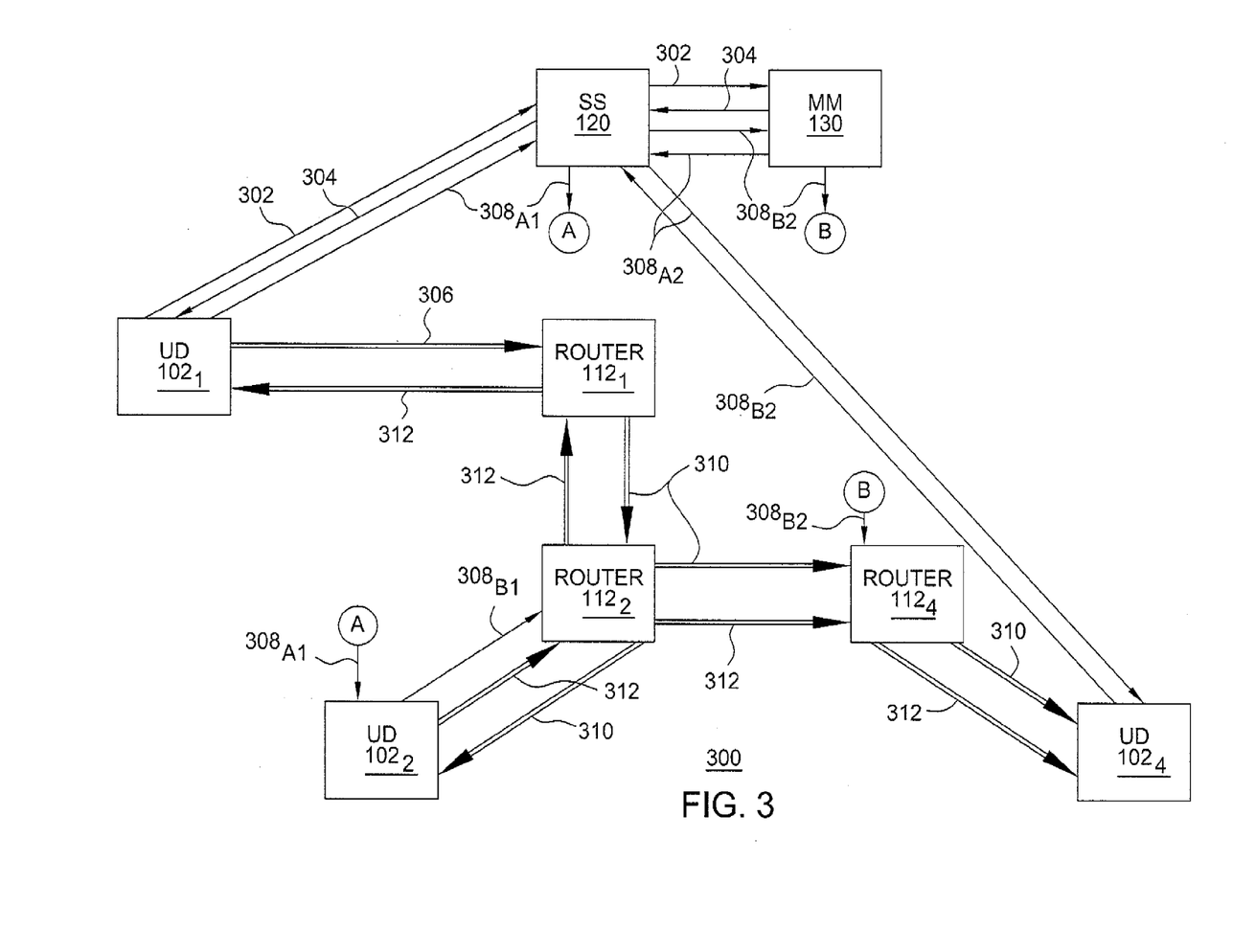
FIG. 3 depicts a high-level block diagram of a portion of the communication network of FIG. 1 including signaling according to one embodiment of the present invention.
Figure 4:
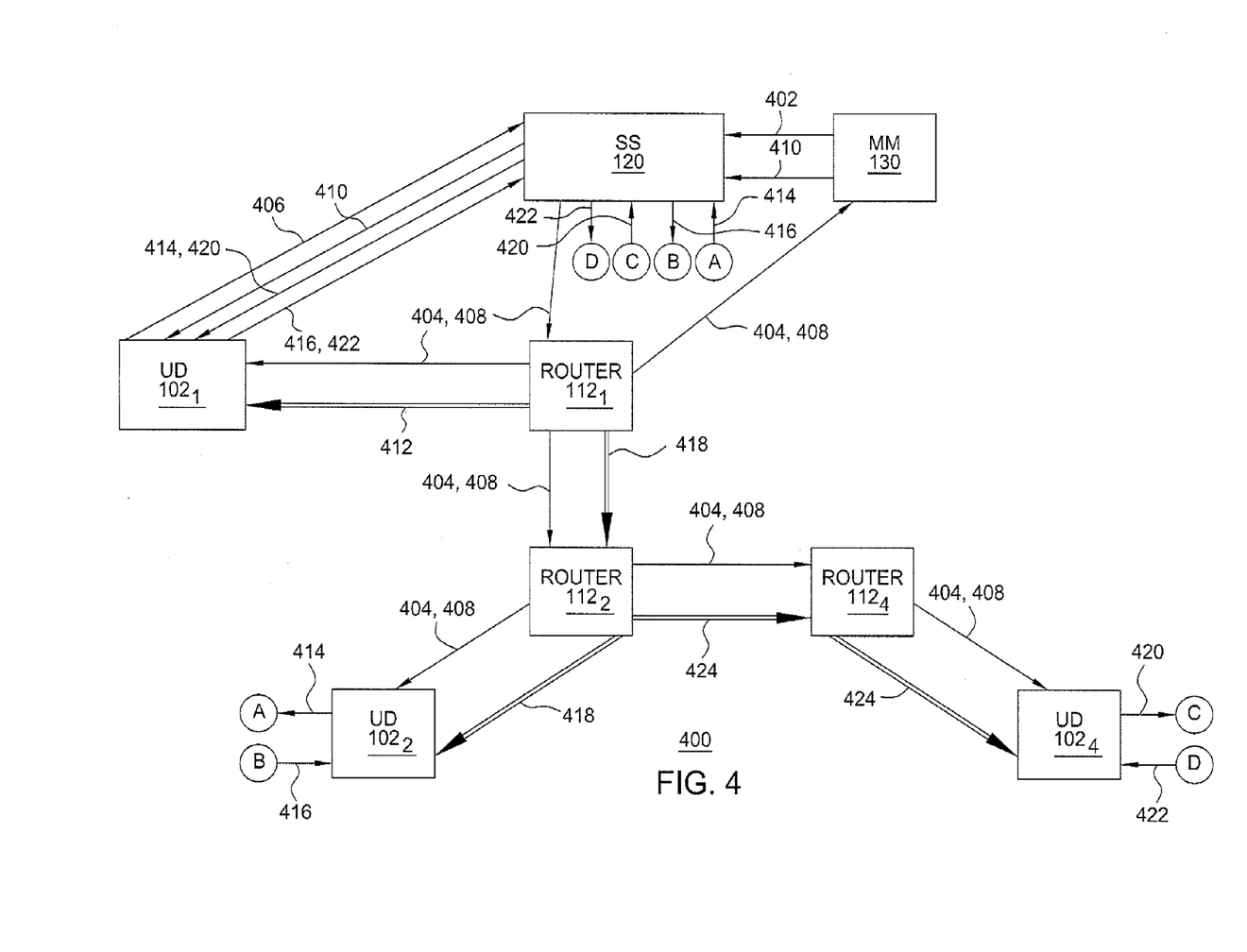
FIG. 4 depicts a high-level block diagram of a portion of the communication network of FIG. 1 including signaling according to one embodiment of the present invention.

FIG. 3 depicts a high-level block diagram of a portion of the communication network of FIG. 1 including signaling according to one embodiment of the present invention. The communication network portion 200 of FIG. 2 includes UDs $102_1$, $102_2$, and $102_4$, and routers $112_1$, $112_2$, and $112_4$. The communication network portion 300 of FIG. 3 further includes SS 120 and MM 130. The signaling depicted and described herein with respect to FIG. 3 is performed in order to establish a multicast group including UDs $102_1$, $102_2$, and $102_4$, and in order to support the associated multicast stream of the established multicast group.

At step 302, UD $102_1$ initiates a request to establish a multicast group. The request to establish the multicast group is similar to the request to establish the multicast group described with respect to FIG. 2 (i.e., the request to establish the multicast group may include various parameters adapted to establish the multicast group, including multicast group definition parameters, multicast session description parameters, and like parameters, as well as various combinations thereof).

As described herein, in one embodiment, the request to establish the multicast group may include a time at which the multicast group is scheduled to be established. If the multicast group is scheduled to be established immediately, MM 130 immediately establishes the multicast group (e.g., by assigning a multicast address to the multicast group and storing at least a portion of the parameters included in the request to establish the multicast group). If the multicast group is scheduled to be established at a later time, MM 130 stores the information received with the request to establish the multicast group for use in establishing the multicast group at the scheduled time. For purposes of clarity in describing the invention, assume that the request to establish the multicast group initiated by UD 102₁ indicates that the multicast group is scheduled to be established immediately.

The UD 102₁ forwards the request to establish the multicast group to SS 120. The SS 120 forwards the request to establish the multicast group to MM 130. In one embodiment, the request to establish the multicast group is conveyed using a SIP INVITE message. In one embodiment, at least a portion of the parameters included in the request to establish the multicast group may be conveyed using one or more existing SIP fields, including SIP header fields and SIP body fields. In one embodiment, for example, at least a portion of the multicast session description parameters may be conveyed using the SIP session description field. In one embodiment, at least a portion of the parameters included in the request to establish the multicast group may be conveyed using new SIP fields, including new SIP header fields and new SIP body fields. In one embodiment, MM 130 may be implemented as a SIP application server.

The MM 130 establishes the multicast group in response to the request to establish the multicast group. The MM 130 establishes the multicast group in a manner similar to establishment of the multicast group as described herein with respect to FIG. 2. The MM 130 assigns the multicast address to the multicast group. The MM 130 stores at least a portion of the parameters (e.g., multicast group definition parameters and multicast session description parameters) included in the request to establish the multicast group. The MM 130 stores the multicast address and the parameters included in the request to establish the multicast group in a manner for associating the multicast address and the parameters with the multicast group.

At step 304, MM 130 initiates a response to the request to establish the multicast group. The MM 130 forwards the response to SS 120. The SS 120 forwards the response to UD 102₁. The response includes the multicast address assigned for the multicast group. The response includes the multicast session description parameters associated with the multicast session for the multicast group. In one embodiment, the multicast session description parameters returned in the response are identical to the multicast session description parameters included in the request to establish the multicast group. The response to the request to establish the multicast group may be conveyed using a SIP OK message.

In one embodiment, in which at least a portion of the multicast session description parameters included in the request to establish the multicast session are not accepted by MM 130, the response may include multicast session description parameters accepted by MM 130 (a portion of which may be different than the requested multicast session description parameters). This response may be conveyed using a SIP OK message. In one embodiment, in which at least a portion of the multicast session description parameters included in the request to establish the multicast session are not accepted by MM 130, the response may be a negative response (e.g., a SIP 486 BUSY message).

At step 306, UD 102₁ begins transmitting multicast traffic to the multicast group. The UD 102₁ begins transmitting multicast traffic using the assigned multicast address. The UD 102₁ begins transmitting multicast traffic using a multicast session in accordance with the accepted multicast session description parameters (returned from MM 130 to UD 102₁ in the response to the request to establish the multicast group). As depicted in FIG. 3, UD 102₁ transmits multicast traffic to router 112₁, from which the multicast traffic may be transmitted to other UDs 102 which join the multicast group, as well as to other routers 112 supporting UDs 102 which join the multicast group. Although depicted as beginning prior to other UDs 102 joining the multicast group, in other embodiments, transmission of multicast traffic by UD 102₁ to the multicast group may occur before, contemporaneous with, or after one or more other UDs 102 begin joining the multicast group.

At step 308, other user devices begin joining the multicast group dynamically requested by UD 102₁ and dynamically established by MM 130. There are several ways in which user devices may join the multicast group. A user device may be invited to join the multicast group (e.g., by a user device which dynamically requested establishment of the multicast group (illustratively, UD 102₁), by a management system associated with establishment of the multicast group (illustratively, MM 130), and the like, as well as various combinations thereof). There are several ways in which a user device may respond to an invitation to join the multicast group.

In one embodiment, a user device may respond to an invitation to join the multicast group using standard multicast join mechanisms of existing multicast protocols (e.g., sending a join message to a router associated with the user device, such as an Internet Group Management Protocol (IGMP) join message, a Multicast Listener Discover (MLD) message, and the like). Although omitted for purposes of clarity, MM 130 is expected to be aware of such joins to (as well as leaves from) the multicast group through routers 112. The MM 130 may be made aware of such joins/leaves using periodic polling from MM 130 to routers 112, explicit signaling from routers 112 to MM 130, and the like, as well as various combinations thereof.

In one embodiment, in which the invitation to join the multicast group is sent using a SIP request message (e.g., SIP INVITE message), a user device may respond to an invitation to join the multicast group with a SIP response message (e.g., SIP OK). In this embodiment, the device which receives the SIP OK message may notify the appropriate router(s) that the user device is joining the multicast group. For example, if the SIP INVITE message originated from one of the UDs 102, that UD 102 may receive the SIP OK message and, in response to the SIP OK message, directly or indirectly (e.g., via SS 120 and/or MM 130) inform the appropriate router that the UD 102 is joining the multicast group. For example, if the SIP INVITE message originated from MM 130, MM 130 may receive the SIP OK message and, in response to the SIP OK message, inform the appropriate router that the UD 102 is joining the multicast group.

At step 308₍A1₎, UD 102₁ sends a SIP INVITE message to UD 102₂ inviting UD 102₂ to join the multicast group. The UD 102₁ sends the SIP INVITE message to SS 120 which forwards the SIP INVITE message to UD 102₂. In one embodiment, the invitation from UD 102₁ to UD 102₂ inviting UD 102₂ to join the multicast group may include the multicast address of the multicast group, as well as one or more multicast session description parameters required by UD 102₂ in order to participate in the multicast group. At step 308₍B1₎, in response to the SIP INVITE message inviting UD 102₂ to join the multicast group, UD 102₂ accepts the invitation from UD $102_1$ to join the multicast group by initiating a standard multicast join to router $112_2$ (e.g., using IGMP, MLD, and like protocols).

At step $308_{A2}$, MM 130 sends a SIP INVITE message to UD $102_4$ inviting UD $102_{24}$ to join the multicast group. The MM 130 sends the SIP INVITE message to SS 120 which forwards the SIP INVITE message to UD $102_4$. In one embodiment, the invitation from MM 130 to UD $102_4$ inviting UD $102_4$ to join the multicast group may include the multicast address of the multicast group, as well as one or more multicast session description parameters required by UD $102_4$ in order to participate in the multicast group. At step $308_{B2}$, in response to the SIP INVITE message inviting UD $102_4$ to join the multicast group, UD $102_4$ accepts the invitation from MM 130 to join the multicast group by initiating a SIP OK message in response to the SIP INVITE message. The UD $102_4$ sends the SIP OK message to SS 120. The SS 120 forwards the SIP OK message to MM 130. In response to the SIP OK message, MM 130 notifies router $112_4$ that UD $102_4$ is joining the multicast group.

At step 310, upon joining the multicast group, UDs $102_2$ and $102_4$ begin receiving multicast traffic from UD $102_1$ over the multicast address of the multicast group. The UD $102_2$ receives multicast traffic from UD $102_1$ via routers $112_1$ and $112_2$. The UD $102_4$ receives multicast traffic from UD $102_1$ via routers $112_1$, $112_2$, and $112_4$. At step 312, upon joining the multicast group, UD $102_2$ begins transmitting multicast traffic to UDs $102_1$ and $102_4$ over the multicast group. The UD $102_1$ receives multicast traffic from UD $102_2$ via routers $112_1$ and $112_2$. The UD $102_4$ receives multicast traffic from UD $102_2$ via routers $112_2$ and $112_4$. Although omitted for purposes of clarity, UDs $102_2$ and $102_4$ may leave the multicast group using any means of leaving the multicast group, such as using standard multicast leaves (e.g., IGMP/MLD leaves), initiating SIP BYE messages to the device(s) which invited the UD 102 to join the multicast group (e.g., UD $102_1$ or MM 130), and the like.

Although omitted for purposes of clarity, rather than being invited to join the multicast group, a user device may request to join the multicast group (e.g., sending a request to a user device which dynamically requested establishment of the multicast group (illustratively, UD $102_1$), sending a request to a management system associated with establishment of the multicast group (illustratively, MM 130), and the like, as well as various combinations thereof). In one embodiment, a request by a user device to join the multicast group may be conveyed using one or more SIP messages (e.g., SIP INVITE messages). In one embodiment, MM 130 may periodically forward a current list of multicast group members to various combinations of non-member user devices which may be used by the non-member user devices as a basis for determining whether to request to join the multicast group (e.g., using SIP INVITE messages, SIP re-INVITE messages, and the like, as well as various combinations thereof).

In one embodiment, in which a user device initiates a request to join the multicast group to a user device which dynamically requested establishment of the multicast group, the user device to which the request is initiated may respond directly to the user device which initiates the request or, alternatively, may forward the request to the management system associated with establishment of the multicast group. If the user device to which the request is initiated responds directly, the direct response may include the multicast address and associated multicast session description parameters of the multicast session. The direct response may be conveyed using one or more SIP messages (e.g., SIP INVITE, SIP OK, and the like, as well as various combinations thereof).

If the request is forwarded to the management system associated with establishment of the multicast group, the management system (illustratively, MM 130) may respond to the request directly, or, alternatively, may instruct one or more routers associated with the joining user device that the user device is joining the multicast group. If the MM 130 responds to the request directly, the direct response may include the multicast address and associated multicast session description parameters of the multicast session. The direct response may be conveyed using one or more SIP messages (e.g., SIP INVITE, SIP OK, and the like, as well as various combinations thereof). The MM 130 may alternatively instruct one or more routers associated with the joining user device that the user device is joining the multicast group (which may be performed in a manner as described with respect to steps $308_{B2}$).

FIG. 4 depicts a high-level block diagram of a portion of the communication network of FIG. 1 including signaling according to one embodiment of the present invention. The communication network portion 400 of FIG. 4 includes UDs $102_1$, $102_2$, and $102_4$, and associated routers $112_1$, $112_2$, and $112_4$. The communication network portion 400 of FIG. 4 further includes SS 120 and MM 130. The signaling depicted and described herein with respect to FIG. 4 is performed in order to establish a multicast group including UDs $102_1$, $102_2$, and $102_4$, and in order to support the associated multicast stream of the established multicast group.

At step 402, MM 130 registers with SS 120 using a SIP REGISTER message. The MM 130 registers using a predefined multicast signaling address known by a number of UDs 102 (e.g., each of UDs 102 depicted with respect to FIG. 1). The MM 130 may manage one or more multicast signaling groups and each multicast signaling group may include one or more multicast signaling addresses. A multicast signaling group including multiple multicast signaling addresses enables further grouping of UDs 102 included within the multicast signaling group, thereby enabling reductions in the number of signaling messages received by specific UDs 102.

For example, UDs $102_1$-$102_4$ may belong to a multicast signaling group and, within the multicast signaling group, UDs $102_1$ and $102_2$ and UDs $102_3$ and $102_4$ may use different multicast signaling addresses. In this example, signaling may be directed to both UDs $102_1$ and $102_2$ without being directed to UDs $102_3$ and $102_4$ and, similarly, signaling may be directed to UDs $102_3$ and $102_4$ without being directed to UDs $102_1$ and $102_2$. In one embodiment, multicast signaling addresses may be hierarchically structured, thereby enabling MM 130 to determine multicast signaling of leaf addresses using the associated root address.

At step 404, a SIP OK message is multicasted to UDs 102 that have joined the multicast signaling group (potentially all user devices in the network). For purposes of clarity, an assumption is made that UDs $102_1$, $102_2$, and $102_4$ have joined the multicast signaling group (and UD $102_3$ has not joined the multicast signaling group). In accordance with this assumption, SS 120 multicasts the SIP OK message to UDs $102_1$ (via router $112_1$), $102_2$ (via routers $112_1$ and $112_2$), and $102_4$ (via routers $112_1$, $112_2$, and $112_4$). The signaling associated with steps 402 and 404 may be performed at any time prior to requests to establish multicast groups.

At step 406, UD $102_1$ creates a request to establish a multicast group and forwards the request to establish the multicast group to MM 130. The UD $102_1$ conveys the request to establish the multicast group as a SIP INVITE message, transmitting the SIP INVITE message to SS 120, which forwards the SIP INVITE message to MM 130. In one embodiment, the request to establish the multicast group is substantially similar to the request to establish the multicast group depicted and described herein with respect to steps 202 and 302 of FIG. 2 and FIG. 3, respectively. In order to support establishment of multicast groups in which the multicast group is scheduled to be established at a future time, MM 130 may operate as a SIP application server (i.e., caching the request to establish the multicast group until the scheduled multicast group establishment time).

At step 408, the SIP INVITE message (i.e., the request to establish the multicast group) is multicasted by SS 120 to all devices that listen to SIP signaling on the multicast signaling address specified by MM 130 (i.e., to all devices which have joined the multicast signaling group). The SS 120 multicasts the SIP INVITE message to UDs $102_1$, $102_2$, and $102_4$ which have joined the multicast signaling group and MM 130 which formed the multicast signaling group. The SS 120 multicasts the SIP INVITE message to UDs $102_1$ (via router $112_1$), $102_2$ (via routers $112_1$ and $112_2$), and $102_4$ (via routers $112_1$, $112_2$, and $112_4$), and MM 130 (via router $112_1$).

As described herein, in one embodiment, the request to establish the multicast group may include a time at which the multicast group is scheduled to be established. If the multicast group is scheduled to be established immediately, MM 130 immediately establishes the multicast group (e.g., by assigning a multicast address to the multicast group and storing at least a portion of the parameters included in the request to establish the multicast group). If the multicast group is scheduled to be established at a later time, MM 130 stores the information received with the request to establish the multicast group for use in establishing the multicast group at the scheduled time. For purposes of clarity in describing the invention, assume that the request to establish the multicast group initiated by UD $102_1$ indicates that the multicast group is scheduled to be established immediately.

The MM 130 establishes the multicast group in response to the request to establish the multicast group. The MM 130 establishes the multicast group in a manner similar to establishment of the multicast group as described herein with respect to FIG. 2 and FIG. 3. The MM 130 assigns the multicast address to the multicast group. The MM 130 stores at least a portion of the parameters (e.g., multicast group definition parameters and multicast session description parameters) included in the request to establish the multicast group. The MM 130 stores the multicast address and the parameters included in the request to establish the multicast group in a manner for associating the multicast address and the parameters with the multicast group.

At step 410, MM 130 initiates a SIP OK message in response to the request to establish the multicast group. The MM 130 forwards the SIP OK message to SS 120 which forwards the SIP OK message to UD $102_1$. The SIP OK response message from MM 130 to UD $102_1$ is not multicast by SS 120 using the multicast signaling group used to multicast the SIP INVITE message (i.e., the request to establish the multicast group). The response includes the multicast session description parameters associated with the multicast session for the multicast group, including the multicast address assigned to the multicast group. In one embodiment, the multicast session description parameters returned in the SIP OK message are identical to the multicast session description parameters included in the SIP INVITE message. In one embodiment, in which at least a portion of the multicast session description parameters included in the request to establish the multicast session are not accepted by MM 130, the response may include multicast session description parameters accepted by MM 130.

At step 412, UD $102_1$ begins transmitting multicast traffic to the multicast group. The UD $102_1$ begins transmitting multicast traffic using the assigned multicast address. The UD $102_1$ begins transmitting multicast traffic using a multicast session in accordance with the accepted multicast session description parameters (returned from MM 130 to UD $102_1$ in the response to the request to establish the multicast group). As depicted in FIG. 4, UD $102_1$ transmits multicast traffic to router $112_1$, from which the multicast traffic may be transmitted to other UDs 102 which join the multicast group, as well as to other routers 112 supporting UDs 102 which join the multicast group. Although depicted as beginning prior to other UDs 102 joining the multicast group, in other embodiments, transmission of multicast traffic by UD $102_1$ to the multicast group may occur before, contemporaneous with, or after one or more other UDs 102 begin joining the multicast group.

At step 414, UD $102_2$ responds to the SIP INVITE message (i.e., the request to establish the multicast group) with a SIP OK message. The UD $102_2$ transmits the SIP OK message to SS 120, which forwards the SIP OK message to UD $102_1$. Since the SIP INVITE message multicast by SS 120 includes the multicast session description parameters, UD $102_2$ receives the multicast session description parameters required to participate in the multicast session as part of the SIP INVITE message multicast by SS 120. The UD $102_2$, however, does not yet have the multicast address required to join the multicast group and participate in the multicast session.

At step 416, UD $102_1$ responds to the SIP OK message with a SIP ACK message. The UD $102_1$ transmits the SIP ACK message to SS 120, which forwards the SIP ACK message to UD $102_2$. The SIP ACK message from UD $102_1$ includes the multicast address assigned by MM 130 and provided by MM 130 to UD $102_1$ (in the SIP OK message of step 410). Although omitted for purposes of clarity, after receiving the multicast address from UD $102_1$, UD $102_2$ may join the multicast group in one of several ways. In one embodiment, UD $102_2$ may join the multicast group using one of the several methods depicted and described herein with respect to FIG. 3. At step 418, upon joining the multicast group, UD $102_2$ begins receiving multicast traffic from UD $102_1$ over the multicast address of the multicast group. The UD $102_2$ receives multicast traffic from UD $102_1$ via routers $112_1$ and $112_2$.

At step 420, at some later time (e.g., later than the time at which UD 1022 responds to the SIP INVITE message), UD $102_4$ responds to the SIP INVITE message (i.e., the request to establish the multicast group) with a SIP OK message. The UD $102_4$ transmits the SIP OK message to SS 120, which forwards the SIP OK message to UD $102_1$. Since the SIP INVITE message multicast by SS 120 includes the multicast session description parameters, UD $102_4$ receives the multicast session description parameters required to participate in the multicast session as part of the SIP INVITE message multicast by SS 120. The UD $102_4$, however, does not yet have the multicast address required to join the multicast group and participate in the multicast session.

At step 422, UD $102_1$ responds to the SIP OK message with a SIP ACK message. The UD $102_1$ transmits the SIP ACK message to SS 120, which forwards the SIP ACK message to UD $102_4$. The SIP ACK message from UD $102_1$ includes the multicast address assigned by MM 130 and provided by MM 130 to UD $102_1$ (in the SIP OK message of step 410). Although omitted for purposes of clarity, after receiving the multicast address from UD $102_1$, UD $102_4$ may join the multicast group in one of several ways. In one embodiment, UD $102_4$ may join the multicast group using one of the several methods depicted and described herein with respect to FIG. 3. At step 424, upon joining the multicast group, UD $102_4$ begins receiving multicast traffic from UD $102_1$ over the multicast address of the multicast group. The UD $102_4$ receives multicast traffic from UD $102_1$ via routers $112_1$, $112_2$, and $112_4$.

Although omitted for purposes of clarity, UDs $102_2$ and $102_4$ may leave the multicast group using any means of leaving the multicast group, such as using standard multicast leaves (e.g., IGMP/MLD leaves), initiating SIP BYE messages UD $102_1$. The MM 130 will not receive such SIP BYE messages from UDs $102_2$ and $102_4$ unless MM 130 is in the signaling path (e.g., unless MM 130 is implemented as a SIP application server). Although omitted for purposes of clarity, the multicast session may be closed by UD $102_1$ (e.g., by sending a SIP BYE message to all UDs 102 which joined the multicast signaling group established by MM 130). The SIP BYE message is multicasted to all UDs 102 which joined the multicast signaling group using the multicast signaling group.

In one embodiment, in which MM 130 is a SIP application server, the SIP OK message initiated by UD $102_1$ (in step 404) and multicast to UDs 102 that have joined the multicast signaling group may be suppressed. In this embodiment, the SIP OK message would be received by MM 130, however, MM 130 would be able to suppress the multicasting of the SIP OK message to UDs $102_1$, $102_2$, and $102_4$.

In one embodiment, in which MM 130 is a SIP application server, the SIP INVITE message (i.e., the request to establish the multicast group multicast by SS 120 to all devices that listen to SIP signaling on the multicast signaling address) may be modified, before the SIP INVITE message is multicasted by SS 120 to all devices that listen to SIP signaling on the multicast signaling address, by MM 130 to include the multicast address assigned by MM 130.

In one embodiment, in which MM 130 is a SIP application server, since MM 130 receives all SIP signaling, MM 130 could set up the multicast paths in the routers in response to SIP OK message received from UDs 102 attempting to join the multicast group, thereby obviating the need for specific multicast joins by each of the UDs 102 (as well as obviating the need for each UD 102 to support an associated multicast stack).

Although omitted from FIGS. 2-4 for purposes of clarity, in one embodiment, the multicast session may be periodically re-announced (e.g., using a SIP RE-INVITE message which may be multicast to various combinations of UDs 102 using one or more multicast signaling groups established as described herein). Although omitted for purposes of clarity, in one embodiment, after the multicast session is established, the multicast session may be altered. The multicast session may be altered by a UD 102 which requested establishment of the multicast group (illustratively, UD $102_1$) or by one or more other UDs 102 which join the multicast group and participate in the multicast session (illustratively, UDs $102_2$ and $102_4$).

The multicast session may be altered such that one or more of the parameters specified in the request to establish the multicast group (or one or more parameters altered in a previous request to alter the multicast session) may be altered. In one embodiment, at least a portion of the multicast group definition parameters may be altered (e.g., to change the list of UDs authorized to join the multicast group, to change permissions associated with one or more UDs authorized to join the multicast group, and the like, as well as various combinations thereof). In one embodiment, at least a portion of the multicast session description parameters may be altered (e.g., to change the ports used in the multicast session, to change the codec used in the multicast session, and the like, as well as various combinations thereof).

In one embodiment, the multicast session may be altered by initiating a SIP RE-INVITE message to MM 130. In one embodiment, the SIP RE-INVITE message may be multicast within the multicast group (i.e., so that only UDs 102 participating in the multicast session receive the SIP RE-INVITE message). For example, the SIP RE-INVITE message may be multicast to UDs $102_2$ and $102_4$. In one embodiment, the SIP RE-INVITE message may be multicast using a multicast signaling group (i.e., so that UDs 102 other than UDs 102 participating in the multicast session receive the SIP RE-INVITE message). For example, the SIP RE-INVITE message may be multicast to UDs $102_1$, $102_2$, $102_3$, and $102_4$.

Although primarily depicted and described herein with respect to user devices, in some embodiments, since end users may access communication networks from multiple user devices associated with one or more network access points, references herein to user device may alternatively refer to a specific user irrespective of the user device by which that user accesses communication networks. In such embodiments, user device may refer to the end user associated with the user device. For example, although primarily described herein with respect to privilege parameters associated with each user device authorized to join a multicast group, privilege parameters may in fact be associated with the respective users associated with the user devices.

Although primarily depicted and described herein with respect to an embodiment in which Any Source Multicast (ASM) is used, the present invention may be implemented in embodiments in which Source Specific Multicast (SSM) is used. For example, although primarily depicted and described herein with respect to multicast streams originating from multiple UDs 102, in one embodiment, only one of the UDs 102 may have permission to transmit to other members of the multicast group. Although primarily depicted and described herein with respect to embodiments in which SIP signaling is used to establish and manage multicast groups, in other embodiments, various other protocols may be used to establish and maintain multicast groups. In one such embodiment, for example, HTTP may be used to establish and maintain multicast groups.

Figure 5:
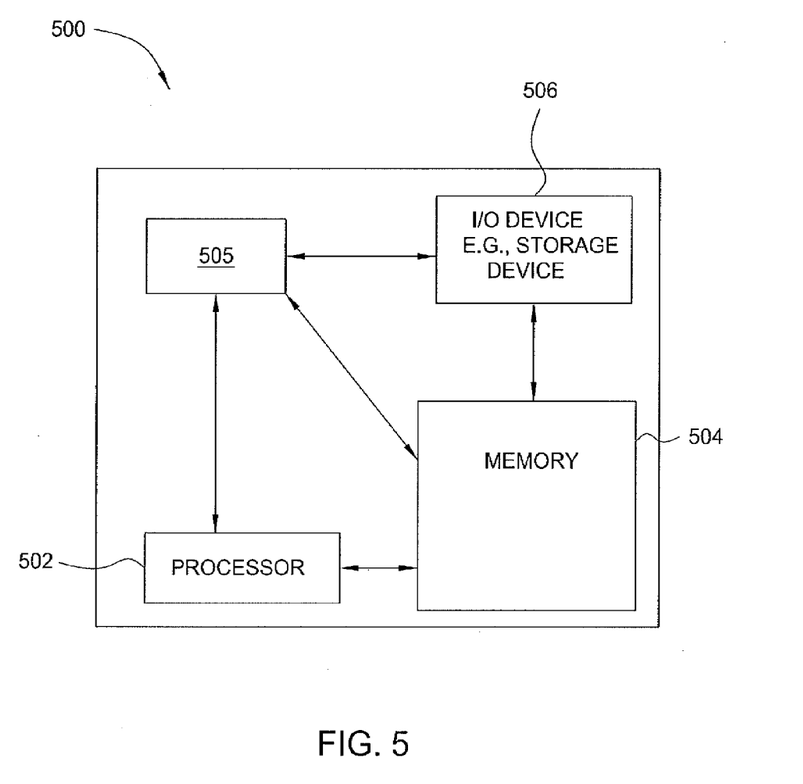
FIG. 5 depicts a high-level block diagram of a general-purpose computer suitable for use in performing at least a portion of the functions described herein.

FIG. 5 depicts a high-level block diagram of a general-purpose computer suitable for use in performing the functions described herein. As depicted in FIG. 5, system 500 includes a processor element 502 (e.g., a CPU), a memory 504, e.g., random access memory (RAM) and/or read only memory (ROM), a multicast group establishment/management module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multicast group establishment/management module or process 505 can be loaded into memory 504 and executed by processor 502 to implement the functions as discussed above. As such, multicast group establishment/management process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method, comprising:
propagating, from a multicast manager toward a server, a registration request including a multicast signaling address associated with a multicast signaling group, the multicast signaling group comprising the multicast manager and a plurality of user devices;
receiving, at the multicast manager, a request of one of the user devices to establish a multicast group, wherein the request of the one of the user devices to establish the multicast group is received via a multicast using the multicast signaling address of the multicast signaling group; and
propagating, from the multicast manager, a response intended for the one of the user devices, the response indicative as to whether the multicast group has been created in response to the request of the one of the user devices to establish the multicast group.

2. The method of claim 1, further comprising:
receiving a registration response at the multicast manager via a multicast of the registration response using the multicast signaling address of the multicast signaling group.

3. The method of claim 1, wherein the request of the one of the user devices to establish the multicast group comprises at least one parameter requested by the one of the user devices for the multicast group, wherein the at least one parameter comprises at least one of at least one multicast group definition parameter or at least one multicast session description parameter.

4. The method of claim 3, wherein at least one of:
the at least one multicast group definition parameter comprises at least one of a time at which the multicast group is scheduled to be established, a list of network elements authorized to initiate an invitation to join the multicast group, or a list of user devices authorized to join the multicast group; or
the at least one multicast session description parameter comprises at least one of an Internet Protocol (IP) address parameter, a port parameter, or a codec parameter.

5. The method of claim 1, wherein the response is propagated from the multicast manager toward the server for delivery from the server to the one of the user devices.

6. The method of claim 1, wherein the response comprises a multicast address assigned by the multicast manager for the multicast group and at least one parameter accepted by the multicast manager for the multicast group.

7. The method of claim 1, wherein the server is a Session Initiation Protocol (SIP) server, wherein the registration request is a SIP registration request, the request is a SIP INVITE message, and the response is a SIP OK message.

8. The method of claim 1, further comprising:
receiving a registration response at the multicast manager; and
preventing multicasting of the registration response from the multicast manager via the multicast signaling group.

9. The method of claim 1, wherein the response comprises a multicast address assigned by the multicast manager for the multicast group, the method further comprising:
modifying the request of the one of the user devices to establish the multicast group to include the multicast address assigned for the multicast group; and
propagating the modified request toward the server for multicasting of the modified request via the multicast signaling group using the multicast signaling address of the multicast signaling group.

10. An apparatus, comprising:
a processor; and
a memory communicatively connected to the processor, the memory having stored thereon instructions which, when executed by the processor, cause the processor to:
propagate, from a multicast manager toward a server, a registration request including a multicast signaling address associated with a multicast signaling group, the multicast signaling group comprising the multicast manager and a plurality of user devices;
receive, at the multicast manager, a request of one of the user devices to establish a multicast group, wherein the request of the one of the user devices to establish the multicast group is received via a multicast using the multicast signaling address of the multicast signaling group; and
propagate, from the multicast manager, a response intended for the one of the user devices, the response indicative as to whether the multicast group has been created in response to the request of the one of the user devices to establish the multicast group.

11. A method, comprising:
receiving, at a server, a registration request of a multicast manager, the registration request including a multicast signaling address associated with a multicast signaling group, the multicast signaling group comprising the multicast manager and a plurality of user devices;
receiving, at the server, a request of one of the user devices to establish a multicast group; and
multicasting the request of the one of the user devices to establish the multicast group from the server using the multicast signaling address of the multicast signaling group.

12. The method of claim 11, further comprising:
multicasting, from the server, a registration response to the registration request, wherein the registration response is multicasted using the multicast signaling address of the multicast signaling group.

13. The method of claim 11, wherein the request of the one of the user devices to establish the multicast group is received from the one of the user devices.

14. The method of claim 11, wherein the request of the one of the user devices to establish the multicast group comprises at least one parameter requested by the one of the user devices for the multicast group, wherein the at least one parameter comprises at least one of at least one multicast group definition parameter or at least one multicast session description parameter.

15. The method of claim 14, wherein at least one of:
the at least one multicast group definition parameter comprises at least one of a time at which the multicast group is scheduled to be established, a list of network elements authorized to initiate an invitation to join the multicast group, or a list of user devices authorized to join the multicast group; or
the at least one multicast session description parameter comprises at least one of an Internet Protocol (IP) address parameter, a port parameter, or a codec parameter.

16. The method of claim 11, further comprising:
receiving, from the multicast manager, a response intended for the one of the user devices, the response indicative that the multicast group has been created in response to the request of the one of the user devices to establish the multicast group; and
propagating the response from the server toward the one of the user devices.

17. The method of claim 16, wherein the response comprises a multicast address assigned by the multicast manager for the multicast group and at least one parameter accepted by the multicast manager for the multicast group.

18. The method of claim 11, wherein the server is a Session Initiation Protocol (SIP) server, wherein the registration request is a SIP registration request, wherein the request is a SIP INVITE message and the response is a SIP OK message.

19. The method of claim 11, wherein the request of the one of the user devices to establish the multicast group is received from the multicast manager and comprises the multicast address assigned for the multicast group.

20. An apparatus, comprising:
a processor; and
a memory communicatively connected to the processor, the memory having stored thereon instructions which, when executed by the processor, cause the processor to:
receive, at a server, a registration request of a multicast manager, the registration request including a multicast signaling address associated with a multicast signaling group, the multicast signaling group comprising the multicast manager and a plurality of user devices;
receive, at the server, a request of one of the user devices to establish a multicast group; and
multicast the request of the one of the user devices to establish the multicast group from the server using the multicast signaling address of the multicast signaling group.

* * * * *